United States Patent [19]

Tamamura et al.

[11] Patent Number: 5,002,372
[45] Date of Patent: Mar. 26, 1991

[54] OPTICAL SYSTEM FOR AMPHIBIOUS CAMERA AND A MOVING DEVICE USING THE SAME

[75] Inventors: Hideo Tamamura; Hiroshi Maeno, both of Tokyo; Hiroki Nakayama, Kanagawa, all of Japan

[73] Assignee: Canon Kabushiki Kaisha, Tokyo, Japan

[21] Appl. No.: 217,082

[22] Filed: Jul. 7, 1988

Related U.S. Application Data

[63] Continuation of Ser. No. 633,193, Jul. 2, 1984, abandoned.

[30] Foreign Application Priority Data

Jul. 28, 1983 [JP] Japan .................. 58-138543

[51] Int. Cl.⁵ .................. G02B 9/60; G02B 9/34
[52] U.S. Cl. .................. 350/418; 350/479; 354/64

[58] Field of Search .................. 350/418, 432, 479; 354/64

[56] References Cited

U.S. PATENT DOCUMENTS

3,320,018  5/1967  Pepke .................. 350/418
3,586,419  6/1971  Wakimoto et al. .................. 350/479
3,992,078  11/1976  Freeman et al. .................. 350/479

Primary Examiner—Bruce Y. Arnold
Assistant Examiner—Rebecca D. Gass
Attorney, Agent, or Firm—Toren, McGeady & Associates

[57] ABSTRACT

An optical system housed within a waterproof package includes, from front to rear, front lens and a rear group of lenses. For both of the front and rear surfaces of the front lens, proper numerical limits of the refractive power of the rear lens group are given to provide an amphibious camera which give a proper optical performance not only in the air but also under water without the necessity of focus adjustment.

6 Claims, 7 Drawing Sheets

F NO/3.6
d-LINE, g-LINE, S.C
-1.00  1.00
SPHERICAL ABERRATION
SINE CONDITION w=31.72°
ΔM, ΔS
-1.00  1.00
ASTIGMATISM w=31.72°
-5.00  5.00
DISTORTION(%)

FIG.5(B)

F NO/3.6
d-LINE, g-LINE, S.C
-1.00  1.00
SPHERICAL ABERRATION
SINE CONDITION w=31.93°
ΔM, ΔS
-1.00  1.00
ASTIGMATISM w=31.93°
-5.00  5.00
DISTORTION(%)

FIG.6(A)

F NO/3.6
d-LINE, g-LINE, S.C
-1.00  1.00
SPHERICAL ABERRATION
SINE CONDITION w=29.84°
ΔS, ΔM
-1.00  1.00
ASTIGMATISM w=29.84°
-5.00  5.00
DISTORTION(%)

F NO/3.6
d-LINE
g-LINE
S.C
-1.00  1.00
SPHERICAL ABERRATION
SINE CONDITION w=36.65°
ΔS
ΔM
-1.00  1.00
ASTIGMATISM w=36.65°
-5.00  5.00
DISTORTION(%)

FIG. 11(B)

F NO/3.6
d-LINE
g-LINE
S.C
-1.00  1.00
SPHERICAL ABERRATION
SINE CONDITION w=36.77°
ΔS
ΔM
-1.00  1.00
ASTIGMATISM w=36.77°
-5.00  5.00
DISTORTION(%)

5,002,372

OPTICAL SYSTEM FOR AMPHIBIOUS CAMERA AND A MOVING DEVICE USING THE SAME

This is a continuation of application Ser. No. 633/193, filed July 23, 1984 now abandoned.

BACKGROUND OF THE INVENTION

1. Field of the Invention

This invention relates to optical systems for amphibious cameras housed within waterproof packages usable either in the air or under water.

2. Description of the Prior Art

The application of waterproof construction techniques to cameras to enable shooting not only in the air but also under water has been well-known for many years and has resulted in a wide variety of so-called amphibious cameras. In this kind of camera, focusing of the photographic optical system results in the prevailing problems which are described below:

(1) In the photographic optical system having a distance adjusting ring, since the object distance is estimated with the eye and then the distance adjusting ring is operated by hand in conformance therewith moving the focusing member to bring the image into focus, the degree of image sharpness is very high. In underwater photography, however, because the photographer must perform while holding his breath, and even worse that under water he loses a stable base on which to stand, he has difficulty manipulating the distance adjusting ring correctly and may have focusing problems.

(2) In the fixed-focus photographic optical system, the focusing position is fixed from the beginning. This offers the advantage that there is no need to perform difficult focusing operations, but gives rise to an alternative problem as stated below: That is, although the camera is usable under water, photographic situations which may be generally encountered are often in the air. Therefore, the optical system is designed to have the above-identified fixed focusing position on an object at a distance suited particularly for in-the-air photography. Specifically, for in-the-air photography, it is most convenient to design the photographic optical system in such a way that an object at a distance of about 3 meters in the air is sharply focused at an image plane with a field depth covering an object distance range from about 1.5 meters to infinity.

Figure 1A:
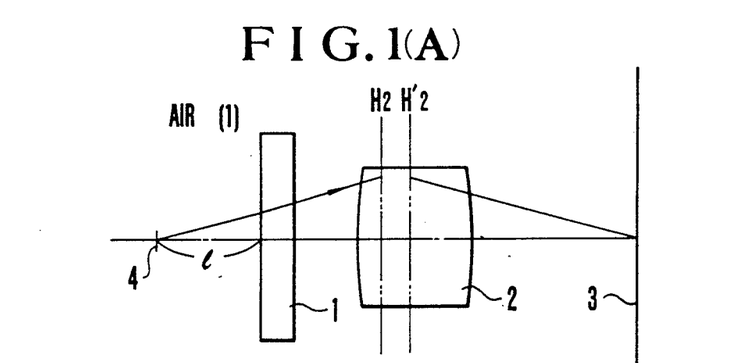
FIGS. 1(A) and 1(B) are geometric diagrams illustrating the prior art photographic lens system design.
Figure 1B:
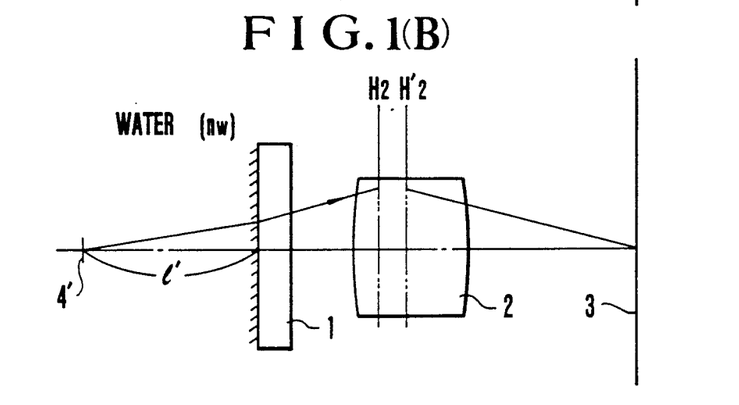

The conventional photographic optical systems of the kind described above, when put into water shifts the aforesaid focusing position to a farther object distance than when in the air. At this time it should be explained in more detail that since the photographic optical system takes the form of a convex lens as a whole, it is better, in view of the aberrational problem and the like, that the front or first lens surface have a convex curvature toward the front. For this reason, most of the ordinary photographic optical systems have their frontmost lens surfaces figured shaped from convex to flat. Particularly for cameras usable under water, it is common practice to make use of a flat glass plate as the protection member for the optical system. In this case, as shown in FIGS. 1(A) and 1(B) for in-the-air and underwater photography respectively, the object point which is sharply focused lies at a farther distance under water than in the air. Now letting l and l' denote the distance from a protection glass plate 1 to object points 4 and 4' of which images are sharply focused on a film plane 3 by the photographic lens 2, and $n_w$ is the index of refraction of water, we have $$l' = n_w l$$

For the given value of the distance l = 3 meters, as the refractive index of water $n_w$ = 1.33, l' = 4 meters is obtained. This is also valid when the protection glass plate 1 is not used, and, instead, the front member of the optical system having a convex front surface toward the front constitutes part of the underwater housing.

In underwater photography, however, fish, coral and the like are principal objects intended to be photographed and are generally shot close up. Another fact is that as the water object distances becomes longer than 5 to 6 meters, the water turbidity of water rapidly increases so that only unclear photographs will be taken. That is, since it is under water that close photography prevails the shift of focal point the photographic optical system focal point for an object under water to a distance greater than in the air is very disadvantageous.

An object of the invention is to provide an amphibious camera which has, despite the fixed in-focus position and in view of quick and easy under water management, to be focused on an object at a substantially shorter distance when under water than when in the air, while still permitting good imaging performance not only in the air but also under water. The feature resides in that as applied to a camera which has a housing constructed for in-the-air photography in the watertight form, the optical system comprises, a front lens component and a rear lens component which satisfies the following conditions:

(a) $-90 fII < R1 < -2.5 fII$ (b) $0 < R1/R2 < 23.4$ where R1 and R2 are the radii of curvature of the front and rear lens surfaces of the front component respectively, and fII is the focal length of a combination of the rear lens surface of the front component with the rear component.

SUMMARY OF THE INVENTION

An optical system for a camera including a front lens component and a rear lens component. The system satisfies the following conditions: —90fII is less than R1, which is less than —2.5fII. 0 is less than R1/R2, which is less than 23.4, where R1 and R2 are the radii of curvature of the front and rear lens surfaces of the front component respectively and fII is the focal length of a combination of the rear lens surface of the front component with the rear component.

BRIEF DESCRIPTION OF THE DRAWINGS

FIGS. 5(A) and 5(B) to FIGS. 11(A) and 11(B) are respectively graphic representations of the various aberrations of Examples 1 to 7.

DETAILED DESCRIPTION OF THE PREFERRED EMBODIMENTS

Figure 2A:
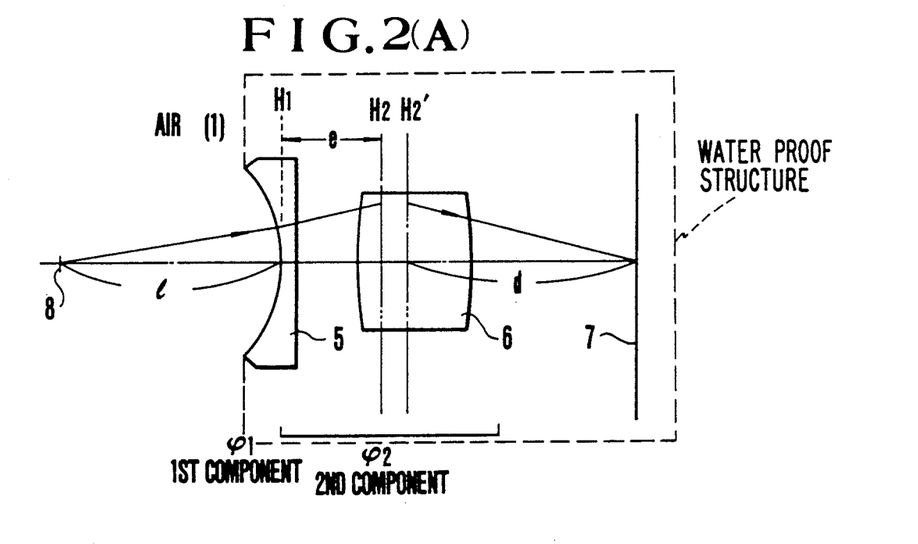
FIGS. 2(A) and 2(B) are geometric diagrams considered to set forth the principle of design of a photographic optical system design of the invention with FIG. 2(A) representing a photographic situation in the air and FIG. 2(B) another photographic situation under water.

The present invention will next be described in more detail by reference to FIGS. 2(A) and 2(B) where a photographic optical system is shown which includes a first lens 5 of which the front or first lens surface has a negative refractive power followed rearwardly by a group of lenses 6, which are almost completely corrected for aberrations in the air. This optical system is incorporated into a waterproof housing construction technique-applied camera (not shown) for amphibious photography. Reference numeral 7 identifies a film plane and reference numeral 8 identifies an object plane. A principal ray of light emerging from the object plane 8 is diverged by the first lens surface of the system before it is focused by the rear group of lenses 6 on the film plane 7.

Figure 2B:
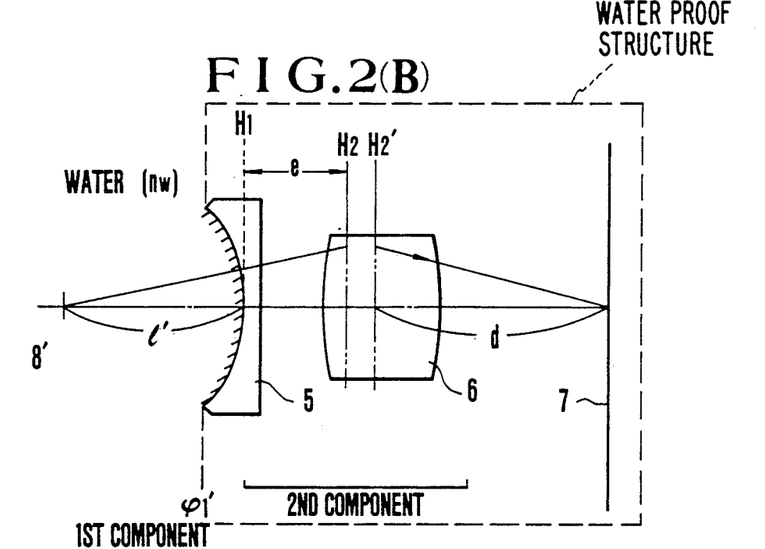

FIG. 2(B) explains the use of the aforesaid lens system under water. Here reference numeral 8' identifies the position of an object as a conjugate point of the aforesaid lens system to an image point on the film plane 7. When applied to underwater photography, in other words, when the medium in front of the first lens surface and when the medium of the entire system is water, the difference between the refractive indices of the front and rear media of that first lens surface is decreased. Therefore, the refractive power of the first lens surface becomes weaker than when in the air. As a result, the reduced length of the optical path obtained by dividing the distance $l'$ from the front vertex to an object of which a sharp image is formed on the film plane 7 under water by the refractive index of water can be shortened from the distance $l$ to another object of which a sharp image is formed on the film plane 7 in the air.

However, whether the value of the distance $l'$ is longer or shorter than that of the distance $l$ depends on what value the refractive power of the first lens surface of the entire system takes. The following discussion will be conducted with the help of numerical formulas.

Now assuming that the first lens surface constitutes a first component and the second lens surface and those that follow constitute a second component and letting $l$ and $l'$ denote, as has been mentioned above, the distances from the front vertex to objects of which sharp images are formed respectively on the film plane 7 in the air and under water "e" identifies the reduced interval between the principal points of the first and second lens components, "d" identifies the interval between the rear principal plane of the second lens component and the film plane, $\delta_1$ and $\delta_2$ the refractive powers of the first lens 5 component respectively in the air and under water, $\delta_2$ the refractive power of the second lens component, fII the focal length of the second lens component, $\delta_{air}$ and $\delta_{water}$ the refractive powers of the entire system respectively in the air and under water, $n_w$ the refractive index of water, "n" the refractive index of the first lens 5, and R1 the radius of curvature of the first lens surface, we have $$\delta_{air} = \delta_1 + \delta_2 - e\delta_1\delta_2 \tag{1}$$

$$\delta_{water} = \delta_1' + \delta_2 - e\delta_1'\delta_2 \tag{2}$$

By reverse ray tracing from the image plane in the paraxial region, the distances $l$ and $l'$ are obtained $$l = \frac{1 - e\left(\phi_2 - \frac{1}{d}\right)}{\phi_{air} + \frac{1}{d}(e\phi_1 - 1)} \tag{3}$$

$$l' = \frac{1 - e\left(\phi_2 - \frac{1}{d}\right)}{\phi_{water} + \frac{1}{d}(e\phi_1' - 1)} \tag{4}$$

where $$\phi_1 = \frac{n-1}{R1}, \phi_1' = \frac{n-n_w}{R1}, R1 < 0,$$

$$l > 0, l' > 0 \tag{5}$$

In order to make the object distance shorter for sharp focus when under water than when in the air, this gives $l > l'$. Hence from $l' > 0$ $$l/l' > 1 \tag{6}$$

If the equations (3) and (4) are unequal (6) we obtain $$\frac{\phi_{water} + \frac{1}{d}(e\phi_1' - 1)}{\phi_{air} + \frac{1}{d}(e\phi_1 - 1)} > n_w \tag{6}'$$

Introduction of (1), (2) and (5) into this inequality and rearrangement give $$\left\{-1 + e\left(\phi_2 - \frac{1}{d}\right)\right\} \cdot \frac{n(n_w - 1)}{R1} -$$

$$(n_w - 1)\left(\phi_2 - \frac{1}{d}\right) > 0$$

Thus we find $$R1 > n\left(e - \frac{1}{\phi_2 - \frac{1}{d}}\right) \tag{7}$$

In conclusion, if the inequality (7) is satisfied, the optical system will be focused at a shorter object distance when under water than when in the air.

For a telephoto lens with its focal length of about 500 mm, by introducing the values of $$\left(\phi_2 - \frac{1}{d}\right) \approx 3.0 \times 10^{-5},$$

$e \approx -600$ mm and $n \approx 1.5$ to 1.9, to inequality (7), we can now determine the lower limit of R1 as $R1 > -90fII$.

For a wide angle lens with its focal length of about 28 mm, by introducing the values of $$\left(\phi_2 - \frac{1}{d}\right) \simeq 1.0 \times 10^{-3},$$

$e \simeq 30$ mm, and $n \simeq 1.5$ to 1.9, to inequality (7), $R1 > -36fII$ is found.

As to the upper limit of R1, though inequality (7) does not provide any particular restriction, considering that of the astigmatism increases in the positive direction, a conclusive result is $R1 < -2.5fII$. Thus, the appropriate range for the radius of curvature of the first lens surface can be written as $$-90fII < R1 < -2.5fII.$$

Assuming again that the second lens surface turns its concave curvature toward the image plane and the lenses 6 that follow the first lens 5 are completely corrected for aberrations, then the field curvature is objectionably increased in a positive sense, so that the image quality deteriorates badly under water as well as in the air.

To avoid this, the aberrations produced from the first lens surface must be corrected by a suitable configuration of the second lens surface. For this reason, another design rule for the relationship between the radii of curvature of the first and second lens surfaces R1 and R2 is formulated as follows:

$$0 < R1/R2 < 23.4 \quad (b)$$

When the lower limit is exceeded, because the first lens 5 takes the bi-concave form, the field curvature is increased positively. When the upper limit is exceeded, because the first lens 5 takes the form of a strong positive meniscus lens, field curvature and astigmatism are greatly increased negatively. In summary, when the condition (b) is violated, the imaging performance is objectionably lowered in both in-the-air and underwater photography.

In the following, a number of numerical specific examples are listed. It is to be noted in connection with Examples 1, 2, 3 and 7 that the 9th lens surface is figured to an aspherical surface by the following equation:

$$X = \frac{(1/R9)Y^2}{1 + \sqrt{1-(Y/R9)^2}} + a1Y^2 + a2Y^4 + a3Y^6 + a4Y^8 + a5Y^{10} + b1|Y|^3 + b2|Y|^5 + b3|Y|^7 + b4|Y|^9$$

where X is the distance between the 9th or aspherical surface and the spherical surface which the radius has a curvature having the same value as that of the radius of curvature R9 of the paraxial region of the aspherical surface in an X-axis parallel to the optical axis at a height Y in a Y-axis perpendicular to the optical axis, with the intersection of the X-axis and Y-axis used as the original point and the direction in which light advances is positive.

The numerical data in accordance with which the seven specific lenses of the invention can be constructed are given in the following tables for the radii of curvature, R, the axial thicknesses and air separations, D, the refractive indices, N, and the Abbe numbers, $\gamma$, of the glass of the lens elements with subscripts numbered consecutively from front to rear along with the even-numbered aspherical coefficients, ai, and the odd-numbered aspherical coefficients, bi.

EXAMPLE 1

| F = 35.0 | FNO = 1:3.6 | 2ω = 63.5 | |
|---|---|---|---|
| R 1 = −1500.000 | D 1 = 4.00 | N 1 = 1.51633 | ν 1 = 64.1 |
| R 2 = ∞ | D 2 = 2.00 | | |
| R 3 = 9.887 | D 3 = 3.00 | N 2 = 1.77250 | ν 2 = 49.6 |
| R 4 = 30.028 | D 4 = 0.93 | | |
| R 5 = −55.700 | D 5 = 1.00 | N 3 = 1.80518 | ν 3 = 25.4 |
| R 6 = 15.241 | D 6 = 1.89 | | |
| R 7 = 24.134 | D 7 = 1.90 | N 4 = 1.60342 | ν 4 = 38.0 |
| R 8 = −24.134 | D 8 = 7.51 | | |
| R 9 = −5.781 | D 9 = 1.60 | N 5 = 1.49171 | ν 5 = 57.4 |
| R 10 = −7.750 | | | |

Aspherical Coefficients for 9th Surface $a1 = -4.88 \times 10^{-3}$, $a2 = 1.54 \times 10^{-4}$, $a3 = -1.44 \times 10^{-5}$,
$a4 = 4.54 \times 10^{-7}$, $a5 = 1.53 \times 10^{-9}$
$b1 = -4.46 \times 10^{-4}$, $b2 = 4.94 \times 10^{-6}$, $b3 = 8.56 \times 10^{-7}$,
$b4 = 5.89 \times 10^{-8}$
$R1 = -43.39fII$
$R1/R2 = 0$

EXAMPLE 2

| F = 37.7 | FNO = 1:3.6 | 2ω = 59.7 | |
|---|---|---|---|
| R 1 = −100.000 | D 1 = 4.00 | N 1 = 1.51633 | ν 1 = 64.1 |
| R 2 = −200.000 | D 2 = 2.00 | | |
| R 3 = 9.887 | D 3 = 3.00 | N 2 = 1.77250 | ν 2 = 49.6 |
| R 4 = 30.028 | D 4 = 0.93 | | |
| R 5 = −55.700 | D 5 = 1.00 | N 3 = 1.80518 | ν 3 = 25.4 |
| R 6 = 15.241 | D 6 = 1.89 | | |
| R 7 = 24.134 | D 7 = 1.90 | N 4 = 1.60342 | ν 4 = 38.0 |
| R 8 = −24.134 | D 8 = 7.51 | | |
| R 9 = −5.781 | D 9 = 1.60 | N 5 = 1.49171 | ν 5 = 57.4 |
| R 10 = −7.750 | | | |

Aspherical Coefficients for 9th Surface $a1 = -4.88 \times 10^{-3}$, $a2 = 1.54 \times 10^{-4}$, $a3 = -1.44 \times 10^{-5}$,
$a4 = 4.54 \times 10^{-7}$, $a5 = 1.53 \times 10^{-9}$
$b1 = -4.46 \times 10^{-4}$, $b2 = 4.94 \times 10^{-6}$, $b3 = 8.56 \times 10^{-7}$,
$b4 = 5.89 \times 10^{-8}$
$R1 = -3.12fII$
$R1/R2 = 0.5$

EXAMPLE 3

| F = 34.8 | FNO = 1:3.6 | 2ω = 63.8 | |
|---|---|---|---|
| R 1 = −3000.000 | D 1 = 4.00 | N 1 = 1.51633 | ν 1 = 64.1 |
| R 2 = ∞ | D 2 = 2.00 | | |
| R 3 = 9.887 | D 3 = 3.00 | N 2 = 1.77250 | ν 2 = 49.6 |
| R 4 = 30.028 | D 4 = 0.93 | | |
| R 5 = −55.700 | D 5 = 1.00 | N 3 = 1.80518 | ν 3 = 25.4 |
| R 6 = 15.241 | D 6 = 1.89 | | |
| R 7 = 24.134 | D 7 = 1.90 | N 4 = 1.60342 | ν 4 = 38.0 |
| R 8 = −24.134 | D 8 = 7.51 | | |
| R 9 = −5.781 | D 9 = 1.60 | N 5 = 1.49171 | ν 5 = 57.4 |
| R 10 = −7.750 | | | |

Aspherical Coefficients for 9th Surface $a1 = -4.88 \times 10^{-3}$, $a2 = 1.54 \times 10^{-4}$, $a3 = -1.44 \times 10^{-5}$, -continued a4 = 4.54 × $10^{-7}$, a5 = 1.53 × $10^{-9}$
b1 = −4.46 × $10^{-9}$, b2 = 4.94 × $10^{-6}$, b3 = 8.56 × $10^{-7}$,
b4 = 5.89 × $10^{-8}$
R1 = −86.7822fII
R1/R2 = 0

EXAMPLE 4

| F = 33.9 | FNO = 1:3.6 | 2ω = 65.1 | |
|---|---|---|---|
| R 1 = −600.000 | D 1 = 4.00 | N 1 = 1.51633 | ν 1 = 64.1 |
| R 2 = −600.000 | D 2 = 2.00 | | |
| R 3 = 10.277 | D 3 = 3.20 | N 2 = 1.77250 | ν 2 = 49.6 |
| R 4 = 31.866 | D 4 = 0.89 | | |
| R 5 = −60.803 | D 5 = 1.00 | N 3 = 1.69895 | ν 3 = 30.1 |
| R 6 = 10.268 | D 6 = 1.95 | | |
| R 7 = 53.463 | D 7 = 1.70 | N 4 = 1.88300 | ν 4 = 40.8 |
| R 8 = −28.368 | | | |
| R1 = −18.127fII | | | |
| R1/R2 = 1.0 | | | |

EXAMPLE 5

| F = 35.3 | FNO = 1:3.6 | 2ω = 63.0 | |
|---|---|---|---|
| R 1 = −400.000 | D 1 = 4.00 | N 1 = 1.51633 | ν 1 = 64.1 |
| R 2 = ∞ | D 2 = 2.00 | | |
| R 3 = 10.277 | D 3 = 3.20 | N 2 = 1.77250 | ν 2 = 49.6 |
| R 4 = 31.866 | D 4 = 0.89 | | |
| R 5 = −60.803 | D 5 = 1.00 | N 3 = 1.69895 | ν 3 = 30.1 |
| R 6 = 10.268 | D 6 = 1.95 | | |
| R 7 = 53.463 | D 7 = 1.70 | N 4 = 1.88300 | ν 4 = 40.8 |
| R 8 = −28.368 | | | |
| R1 = −11.7646fII | | | |
| R1/R2 = 0.0 | | | |

EXAMPLE 6

| F = 33.5 | FNO = 1:3.6 | 2ω = 65.8 | |
|---|---|---|---|
| R 1 = −600.000 | D 1 = 4.00 | N 1 = 1.51633 | ν 1 = 64.1 |
| R 2 = −400.000 | D 2 = 2.00 | | |
| R 3 = 10.277 | D 3 = 3.20 | N 2 = 1.77250 | ν 2 = 49.6 |
| R 4 = 31.866 | D 4 = 0.89 | | |
| R 5 = −60.803 | D 5 = 1.00 | N 3 = 1.69895 | ν 3 = 30.1 |
| R 6 = 10.268 | D 6 = 1.95 | | |
| R 7 = 53.463 | D 7 = 1.70 | N 4 = 1.88300 | ν 4 = 40.8 |
| R 8 = −28.368 | | | |
| R = −18.3673fII | | | |
| R1/R2 = 1.5 | | | |

EXAMPLE 7

| F = 29.1 | FNO = 1:3.6 | 2ω = 73.3 | |
|---|---|---|---|
| R 1 = −2300.000 | D 1 = 4.00 | N 1 = 1.51633 | ν 1 = 64.1 |
| R 2 = −100.000 | D 2 = 2.00 | | |
| R 3 = 9.887 | D 3 = 3.00 | N 2 = 1.77250 | ν 2 = 49.6 |
| R 4 = 30.028 | D 4 = 0.93 | | |
| R 5 = −55.700 | D 5 = 1.00 | N 3 = 1.80518 | ν 3 = 25.4 |
| R 6 = 15.241 | D 6 = 1.89 | | |
| R 7 = 24.134 | D 7 = 1.90 | N 4 = 1.60342 | ν 4 = 38.0 |
| R 8 = −24.134 | D 8 = 7.51 | | |
| R 9 = −5.781 | D 9 = 1.60 | N 5 = 1.49171 | ν 5 = 57.4 |
| R 10 = −7.750 | | | |

Aspherical Coefficients for 9th Surface a1 = −4.88 × $10^{-3}$, a2 = 1.54 × $10^{-4}$, a3 = −1.44 × $10^{-5}$, -continued a4 = 4.54 × $10^{-7}$, a5 = 1.53 × $10^{-9}$
b1 = −4.46 × $10^{-4}$, b2 = 4.94 × $10^{-6}$, b3 = 8.56 × $10^{-7}$,
b4 = −5.89 × $10^{-8}$
R1 = −79.62fII
R1/R2 = 23.0

Figure 3:
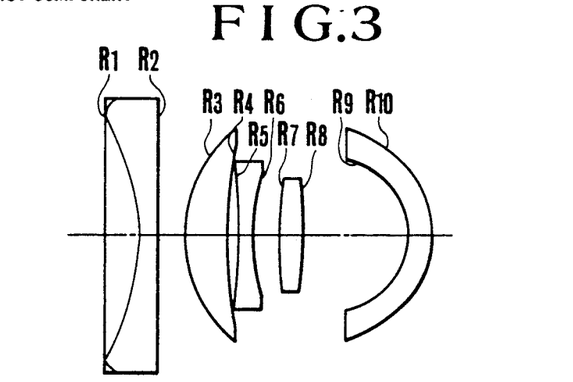
FIG. 3 is a lens block diagram of Examples 1-3 of a specific photographic optical system of the invention.
Figure 4:
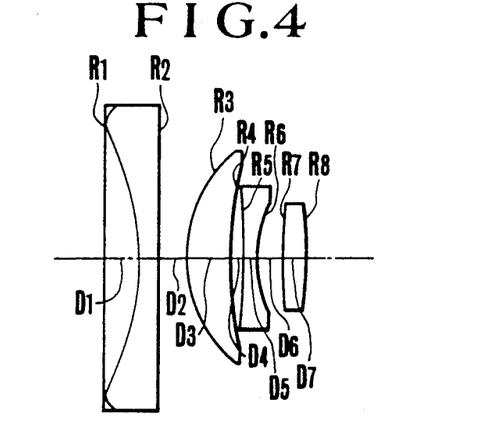
FIG. 4 is a lens block diagram of Examples 4-7 of a specific photographic optical system of the invention.

FIG. 3 is a longitudinal section view illustrating Examples 1–3 the specific photographic optical system of the invention, and FIG. 4 is a similar view illustrating Examples 4–7 of the specific photographic optical system of the invention. It should be noted that the curvature of surface R1 in FIGS. 3 and 4 has been greatly exaggerated to clearly show that it is concave toward the object.

Figure 5A:
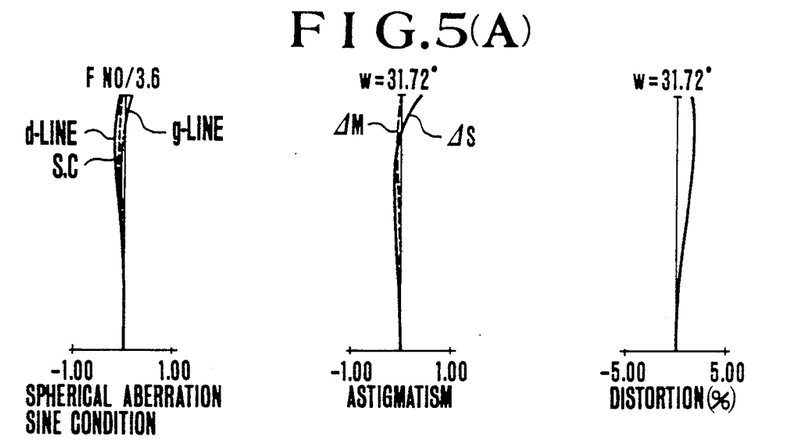
Figure 5B:
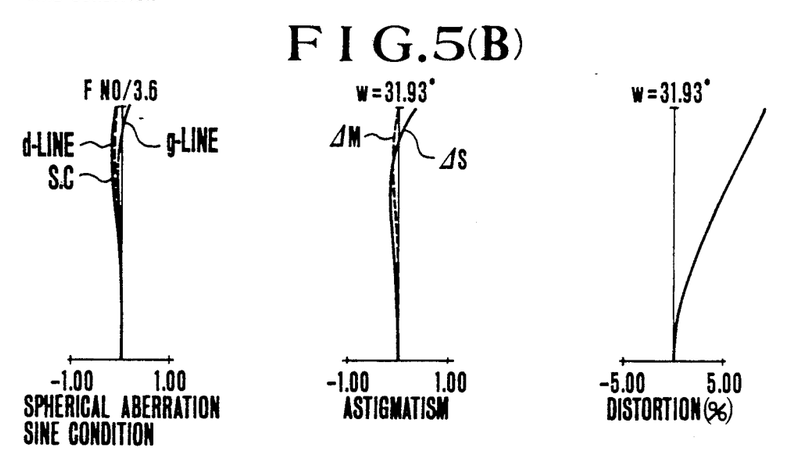

FIG. 5(A) illustrates the longitudinal aberrations of the lens of FIG. 3 with an object at a distance of 3 meters from the film plane 7 in the air, and FIG. 5(B) illustrates the longitudinal aberrations of the lens of FIG. 3 with an object at a distance of 2.4 meters from the film plane 7 under water. In either case, the back focal distance is the same. It will be understood that the lens of FIG. 3 has an acceptable optical performance for use in actual practice.

Figure 6A:
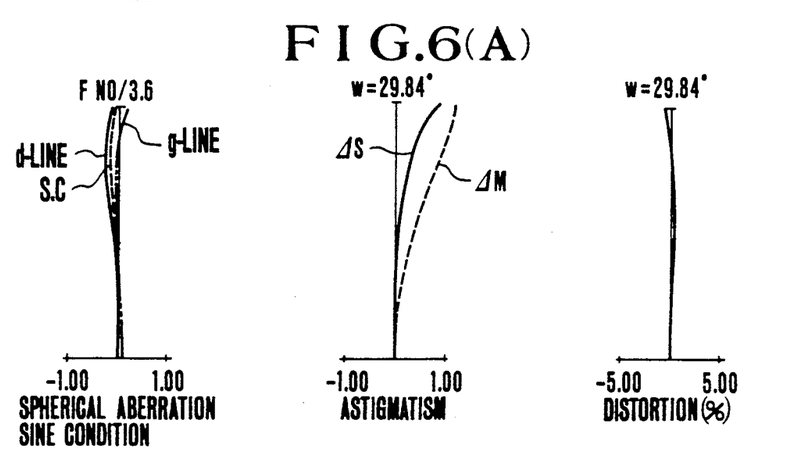
Figure 6B:
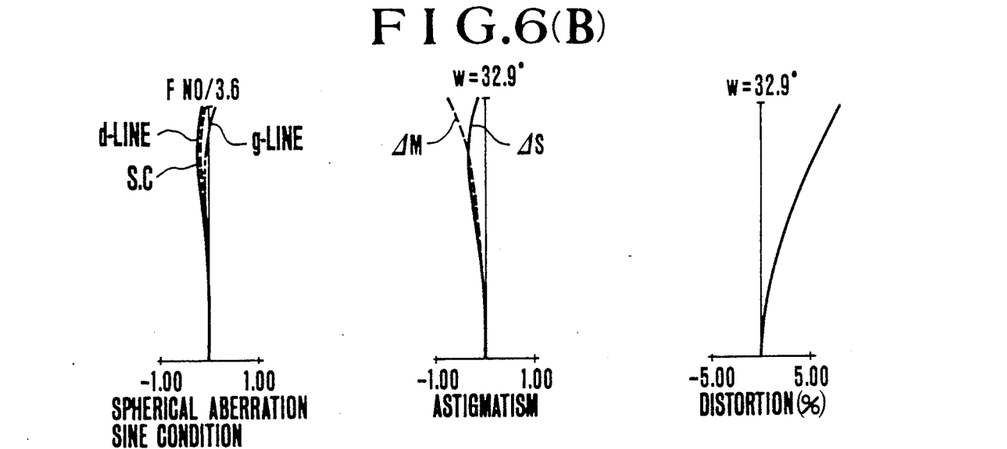

FIG. 6(A) illustrates the longitudinal aberrations of Example 2 of the specific lens with an object at a distance of 3 meters from the film plane 7 in the air, and FIG. 6(b) illustrates the longitudinal aberrations of Example 2 with an object at a distance of 0.4 meters from the film plane 7 under water. In either case, the back focal distance remains the same. Because the value of the first lens radius of the curvature R1 falls near the upper limit of inequalities (a), the astigmatism of Example 2 is increased positively, but its optical performance is sufficiently usable in actual practice.

Figure 7A:
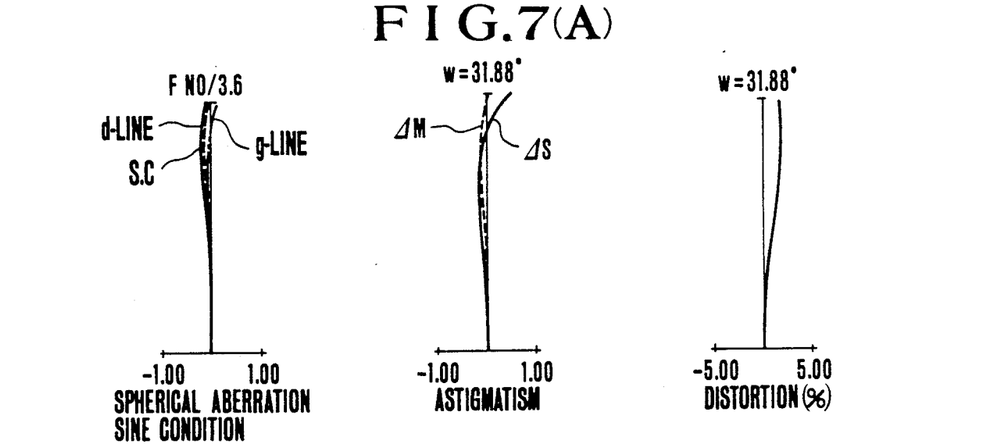
Figure 7B:
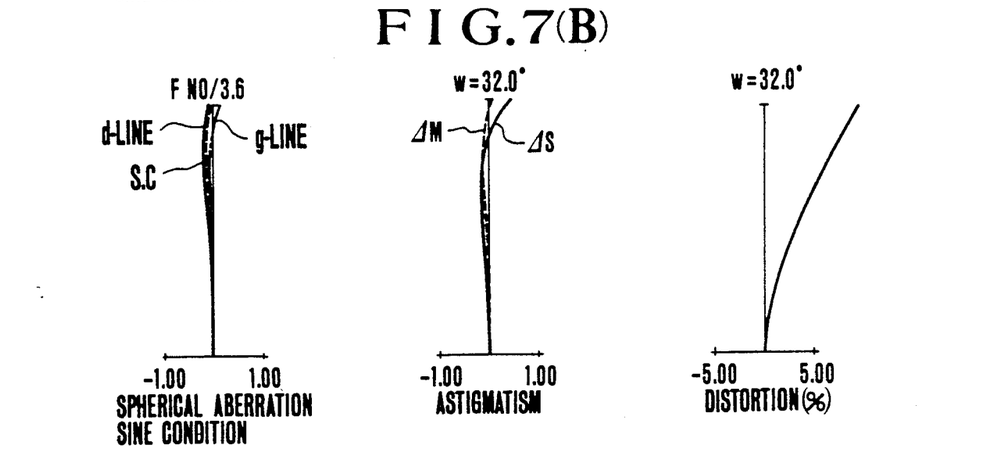

FIGS. 7(A) and 7(B) illustrate the longitudinal aberrations of Example 3 with objects respectively at distances of 3 and 2.95 meters from the film plane 7 in the air and under water and with the same back focal distance. In Example 3, the difference between the object distances for sharp focus in the air and under water is very small, or the value of factor of inequalities (a) is near the lower limit. Because the first lens is almost of a flat plate, a sufficiently good performance is obtained.

Figure 8A:
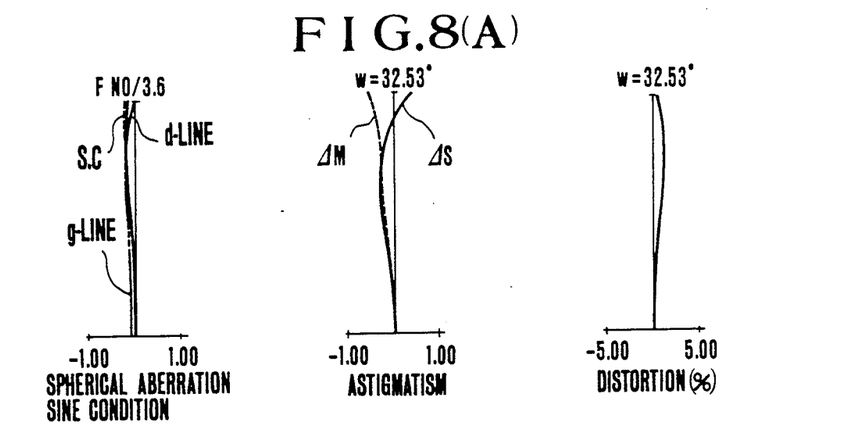
Figure 8B:
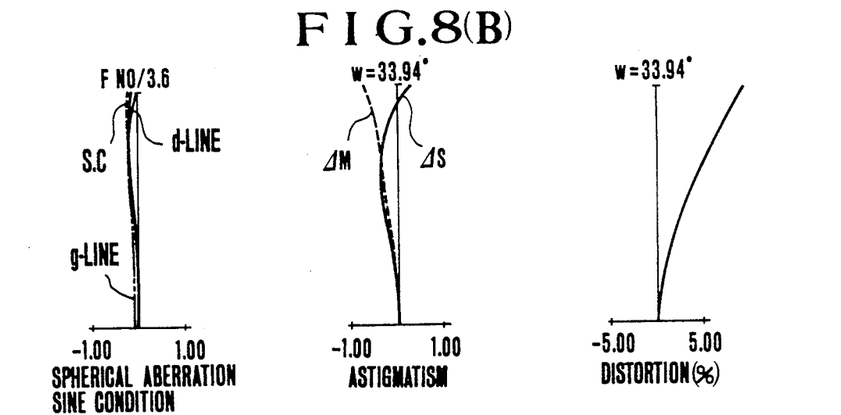

FIGS. 8(A) and 8(B) show the longitudinal aberration curves of Example 4 with objects at distances of 3 meters and 1.55 meters in the air and under water respectively and the same back focal distance. Because in Example 4, the first lens has almost no refractive power as is represented by R1/R2=1, a sufficiently good performance is obtained.

Figure 9A:
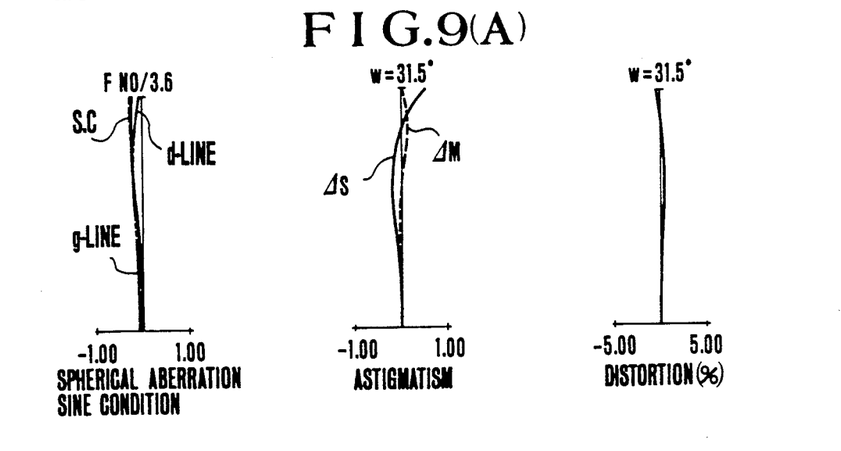
Figure 9B:
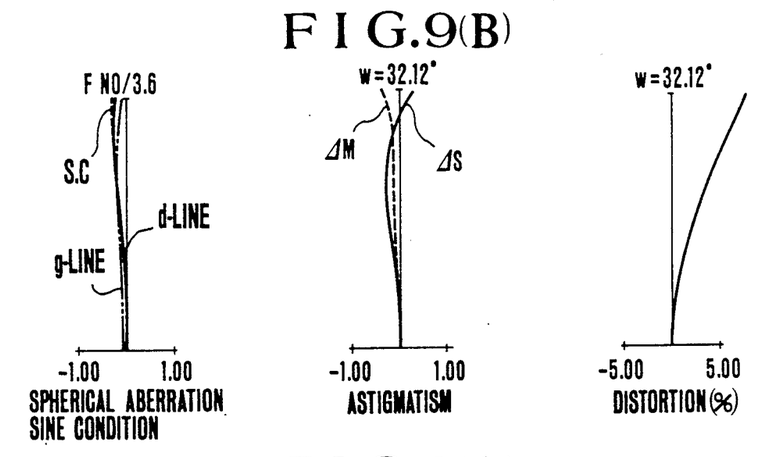

FIGS. 9(A) and 9(B) show longitudinal aberration curves of Example 5 with objects at distances of 3 and 1.15 meters in the air and under water respectively and the same back focal distance. Example 5 provides an acceptable optical performance for use in actual practice.

Figure 10A:
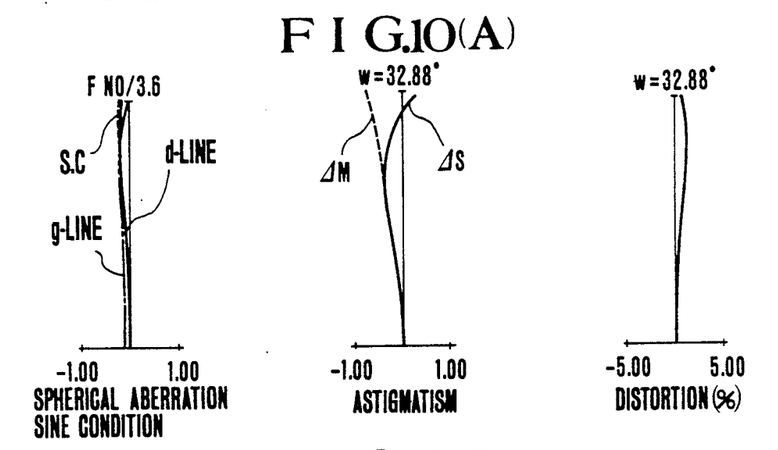
Figure 10B:
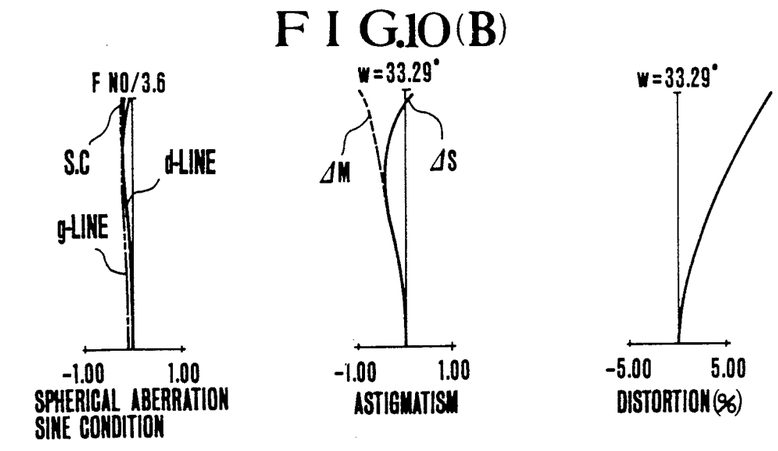

FIGS. 10(A) and 10(B) show the longitudinal aberration curves of Example 6 with objects at distances of 3 and 1.55 meters from the film plane in the air and under water respectively and the same back focal distance. Also in Example 6, an acceptable optical performance for use in actual practice is obtained.

Figure 11A:
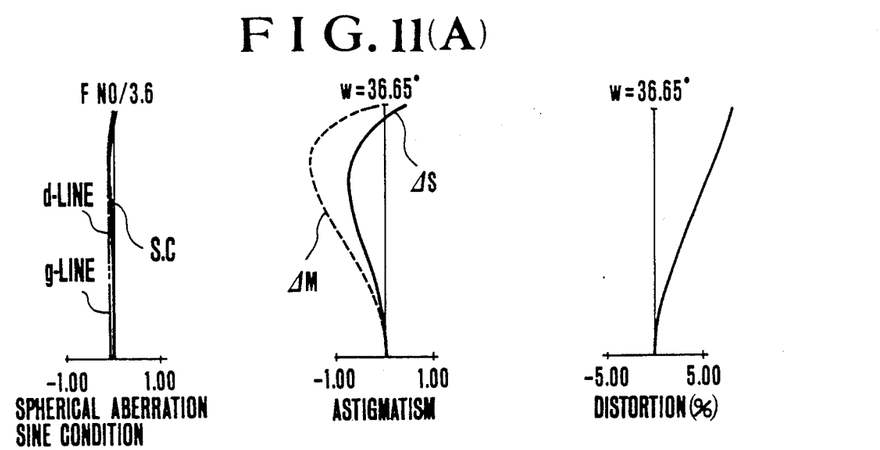
Figure 11B:
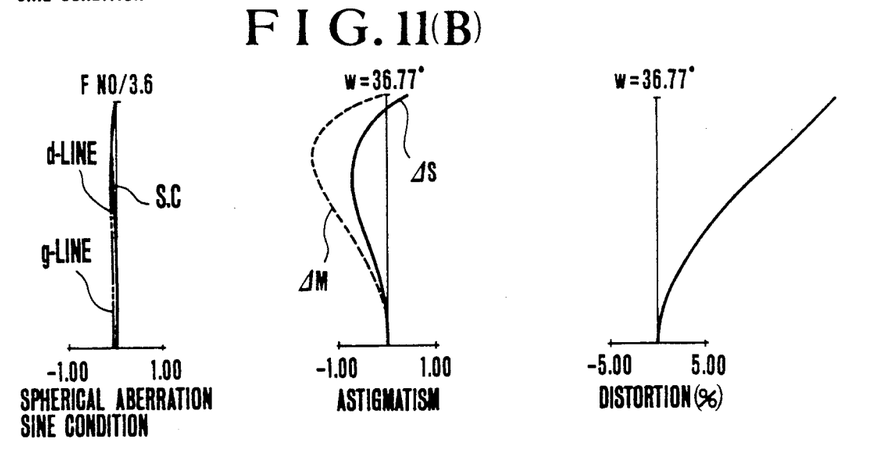

FIGS. 11(A) and 11(B) show the longitudinal aberration curves of Example 7 with objects at distances of 3 and 2.8 meters from the film plane in the air and under water respectively and the same back focal distance.

Because in Example 7 the value of the ratio of the radii of curvature of the first and second lens surfaces or R1/R2 lies near the upper limit of inequalities (b), the astigmatism is somewhat large in the negative sense, but the performance is sufficiently usable in actual practice.

As has been described in greater detail above, according to the present invention, when the camera is put into water, without the necessity of carrying out any focusing operation, objects at close distances can be shot while preserving as high imaging performance as in the air. Therefore, the present invention has advantageously achieved a good compromise between the requirement of operating the amphibious camera with selection of different working distances respectively suited for in-the-air and underwater photographies and the requirement of keeping a quicker and easier management of the camera even under water.

It should be also pointed out that though the use of an auto-focus mechanism in the camera may be considered to effect an equivalent result to that described above, as compared with this, the use of the optical system of the invention provides a possibility of remarkably reducing the complexity of structure of the camera with an advantage of a large cost down and a large reduction of the weight and bulk and size of the camera.

Though the illustrated embodiments of the invention have been described in connection with the photographic lens for the amphibious camera, it is to be understood that the present invention is not confined thereto and is applicable to finder optical systems for amphibious cameras and also to other types of optical systems for the same camera.

What we claim is:

1. A photographic lens with its frontmost lens surface being brought into contact with air and water, comprising:
   a front lens component which has a front lens surface concave to an object and makes an object distance to an object, to which an in-focus state is to be secured under water, shorter than an object distance to an object to which an in-focus state is to be secured in air; and
   a rear lens component for imaging a light flux projected from said front lens component.

2. A photographic lens according to claim 1, which satisfies the condition of $$-90 f_{II} < R1 < -2.5 f_{II}$$

in which R1 represents the curvature radius of the frontmost lens surface and $f_{II}$ represents the compound refractive power of the rearmost lens surface of the front lens and said rear lens component.

3. A photographic lens according to claim 1, wherein said rear lens component is composed of a positive lens, a negative lens, a positive lens and a negative lens considerably separated from the last positive lens.

4. A photographic lens according to claim 1, wherein said rear lens component is composed of a positive lens, a negative lens and a positive lens.

5. An amphibious camera comprising:
   a camera casing having a front wall formed with an opening and waterproofed except for said opening;
   a focusing optical system including a front element having a concave front surface and said system as a whole has a positive power so as to focus on an object; and means for holding said front element in watertight register with said opening with said concave front surface interfacing with air and water when said camera is used on land and in water, respectively, wherein the curvature of said concave front surface is so selected that said focusing optical system focuses on a farther object at a first predetermined distance on land and on a closer object at a second predetermined distance in water, respectively, due to difference in the indices of refraction of air and water with which said concave front surface contacts, said first predetermined distance being longer than said second predetermined distance.

6. An amphibious camera as defined in claim 5, wherein said front element is formed as a lens having said concave front face.

* * * * *

UNITED STATES PATENT AND TRADEMARK OFFICE
CERTIFICATE OF CORRECTION

PATENT NO. : 5,002,372

DATED : March 26, 1991

INVENTOR(S) : Hideo Tamamura et al

It is certified that error appears in the above-identified patent and that said Letters Patent is hereby corrected as shown below:

On the title page:
Related U.S. Application Data

[63] Continuation of Ser. No. 633,193, July 23, 1984, abandoned

Signed and Sealed this

Thirteenth Day of October, 1992

Attest:

DOUGLAS B. COMER

*Attesting Officer*  *Acting Commissioner of Patents and Trademarks*